United States Patent
Haranger et al.

(10) Patent No.: US 11,675,103 B2
(45) Date of Patent: Jun. 13, 2023

(54) DRILLING FLUID ACTIVATION CORRECTION VIA NEUTRON GENERATOR MODULATION

(71) Applicant: Schlumberger Technology Corporation, Sugar Land, TX (US)

(72) Inventors: Fabien Haranger, Sugar Land, TX (US); Marie-Laure Mauborgne, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 24 days.

(21) Appl. No.: 17/257,613

(22) PCT Filed: Jul. 5, 2019

(86) PCT No.: PCT/US2019/040669
§ 371 (c)(1),
(2) Date: Jan. 4, 2021

(87) PCT Pub. No.: WO2020/010294
PCT Pub. Date: Jan. 9, 2020

(65) Prior Publication Data
US 2021/0270994 A1    Sep. 2, 2021

Related U.S. Application Data

(60) Provisional application No. 62/694,354, filed on Jul. 5, 2018.

(51) Int. Cl.
*G01V 5/10* (2006.01)
*G01V 5/06* (2006.01)
*E21B 49/00* (2006.01)

(52) U.S. Cl.
CPC ............... *G01V 5/101* (2013.01); *G01V 5/06* (2013.01); *E21B 49/00* (2013.01)

(58) Field of Classification Search
CPC ....................................................... G01V 5/101
See application file for complete search history.

(56) References Cited

U.S. PATENT DOCUMENTS 2,856,537 A * 10/1958 Clark ................. G01V 5/101
250/262
3,281,599 A * 10/1966 Baker ................. G01V 5/12
250/269.3

(Continued)

FOREIGN PATENT DOCUMENTS

WO    2016179516 A1   11/2016

OTHER PUBLICATIONS

International Search Report and Written Opinion issued in International Patent application PCT/US2019/040669 dated Oct. 2019, 11 pages.

(Continued)

*Primary Examiner* — David P Porta
*Assistant Examiner* — Djura Malevic
(74) *Attorney, Agent, or Firm* — Jeffrey D. Frantz

(57) ABSTRACT

A method for making natural gamma ray measurements includes deploying a logging while drilling tool including an electrical neutron output of the electrical neutron source is modulated and the natural gamma ray sensor is used to make a corresponding gamma ray measurement during at least a portion of the modulation. The gamma ray measurement is processed to obtain a corrected total natural gamma ray measurement of the subterranean formation.

15 Claims, 6 Drawing Sheets

(56) References Cited

U.S. PATENT DOCUMENTS

| | | | | |
|---|---|---|---|---|
| 3,825,753 | A * | 7/1974 | Givens | G01V 5/105 250/269.2 |
| 3,914,603 | A * | 10/1975 | Paap | G01V 5/104 250/269.2 |
| 3,928,762 | A * | 12/1975 | Peelman | G01V 5/102 376/165 |
| 3,930,152 | A * | 12/1975 | Pitts, Jr. | G01V 5/102 250/269.5 |
| 3,940,611 | A * | 2/1976 | Arnold | G01V 5/102 376/160 |
| 3,940,613 | A * | 2/1976 | Paap | G01V 5/102 250/269.5 |
| 3,979,300 | A * | 9/1976 | Paap | G01V 5/102 250/269.5 |
| 4,180,728 | A * | 12/1979 | Goldstein | G01V 5/105 250/269.2 |
| 4,857,729 | A * | 8/1989 | Gadeken | E21B 47/11 250/260 |
| 4,926,004 | A * | 5/1990 | Pelrine | C07C 2/10 585/10 |
| 4,926,044 | A * | 5/1990 | Wraight | G01V 5/105 250/266 |
| 5,408,097 | A * | 4/1995 | Wraight | G01V 5/06 250/264 |
| 5,459,314 | A * | 10/1995 | Plasek | G01V 5/12 250/269.3 |
| 6,051,830 | A * | 4/2000 | Moake | G01V 13/00 250/252.1 |
| 6,703,606 | B2 * | 3/2004 | Adolph | G01V 5/104 250/269.4 |
| 7,081,616 | B2 * | 7/2006 | Grau | G01T 1/40 250/262 |
| 7,361,886 | B2 * | 4/2008 | Stoller | G01V 5/125 250/269.1 |
| 7,365,307 | B2 * | 4/2008 | Stoller | G01V 5/104 250/269.2 |
| 7,800,052 | B2 * | 9/2010 | Gadot | G01T 1/40 250/261 |
| 8,049,164 | B2 * | 11/2011 | Kirkwood | G01V 5/101 250/269.1 |
| 9,329,302 | B2 * | 5/2016 | Stoller | G01T 1/362 |
| 9,500,753 | B2 * | 11/2016 | Moake | G01T 1/40 |
| 10,317,568 | B2 * | 6/2019 | Mauborgne | G01V 5/06 |
| 10,564,311 | B2 * | 2/2020 | Stoller | G01V 5/101 |
| 10,866,336 | B2 * | 12/2020 | Stoller | G01V 5/101 |
| 2005/0127282 | A1 * | 6/2005 | Grau | G01T 1/40 250/262 |
| 2007/0241275 | A1 * | 10/2007 | Guo | G01V 5/145 250/269.1 |
| 2009/0123071 | A1 * | 5/2009 | Iwasaki | G06V 10/22 382/176 |
| 2009/0321622 | A1 * | 12/2009 | Stoller | G01V 5/101 250/269.3 |
| 2014/0343856 | A1 * | 11/2014 | Zhou | E21B 47/11 702/8 |
| 2015/0090870 | A1 * | 4/2015 | Stoller | G01V 5/101 250/269.6 |
| 2017/0363770 | A1 * | 12/2017 | Mauborgne | G01V 13/00 |
| 2018/0059283 | A1 * | 3/2018 | Xu | G01V 13/00 |
| 2018/0364184 | A1 * | 12/2018 | Reiderman | G01R 33/307 |
| 2021/0169417 | A1 * | 6/2021 | Burton | A61B 5/4812 |

OTHER PUBLICATIONS

Exam Report Under Section 18(3) issued in United Kingdom Patent Application GB2100088.0 dated Jan. 26, 2022, 5 pages.

* cited by examiner

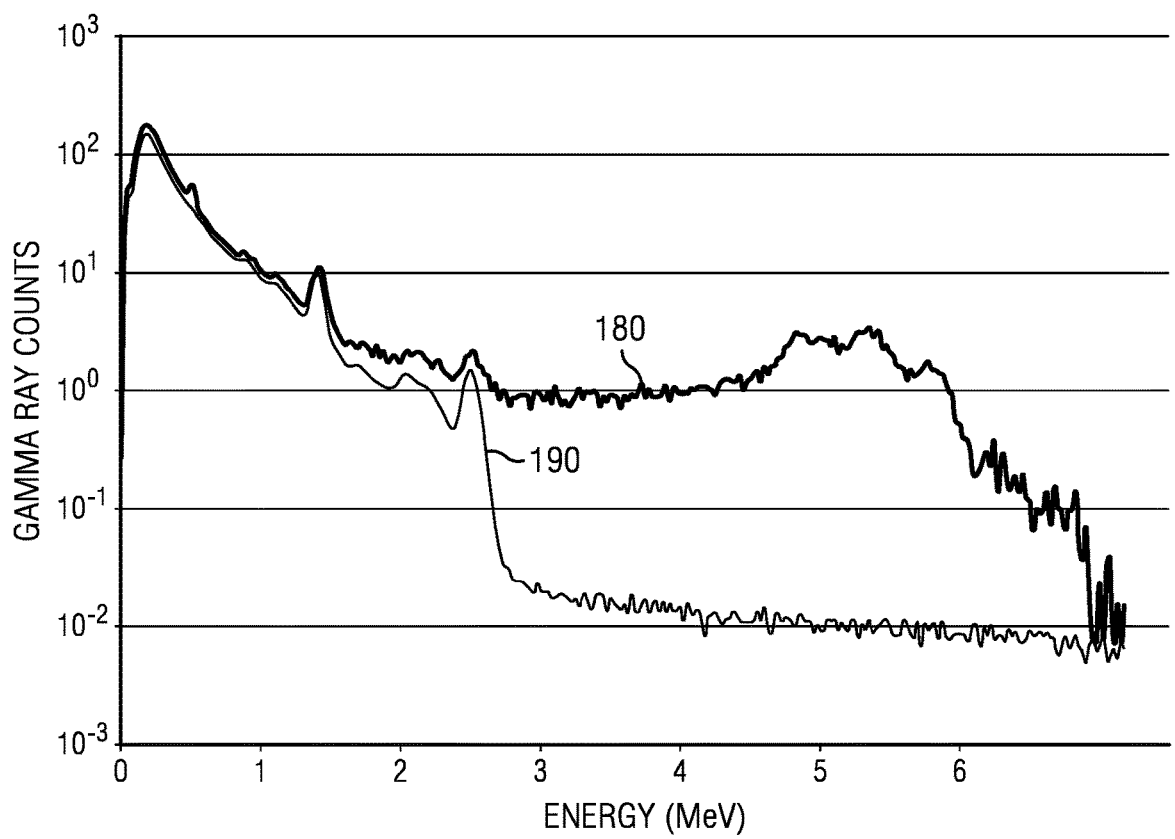
FIG. 3
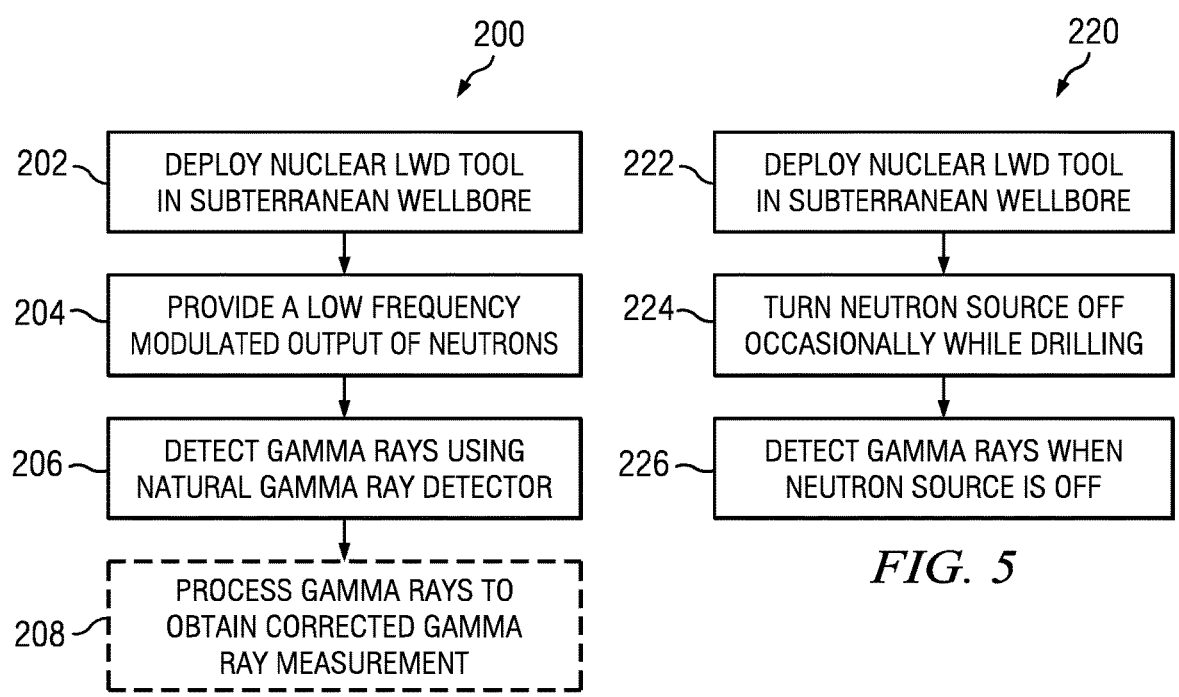
FIG. 4
FIG. 5

DRILLING FLUID ACTIVATION CORRECTION VIA NEUTRON GENERATOR MODULATION

CROSS REFERENCE TO RELATED APPLICATIONS

This application claims the benefit of U.S. Provisional Application Ser. No. 62/694,354 entitled Pulsed Neutron Generator (PNG) Output Modulation for Error Reduction in the Oxygen Activation Correction, filed Jul. 5, 2018.

FIELD OF THE INVENTION

Disclosed embodiments relate generally to nuclear logging operations such as neutron and natural gamma ray logging and more specifically to a method of correcting natural gamma ray logs for measurement bias caused by drilling fluid (e.g., oxygen) activation gamma rays induced by fast neutrons.

BACKGROUND INFORMATION

Natural gamma ray logging is one of the most common logging techniques in the oil and gas industry. Such logging operations measure the naturally occurring gamma radiation emitted by a subterranean formation, primarily from potassium, uranium, and thorium containing minerals in the formation. Both total gamma ray and spectral gamma ray sensors are commonly employed. Total gamma ray sensors measure the total number of detected gamma rays (e.g., with energy above one or more predetermined thresholds). Radioactive elements tend to concentrate in shales and clays, while clean sands and limestone formations tend to have low levels of natural radioactivity. A gamma ray log indicates the shale content of a formation, with shale reading high radioactivity and sands and limestone reading low. Natural gamma ray logging is traditionally used for correlating zones from well to well, for preliminary identification of lithology, and for rough estimation of the volume of shale present in the formation. Spectral gamma ray sensors measure the energy spectrum of the emitted gamma rays and may be used to determine the weight concentrations of potassium, uranium, and thorium in the formation. This elemental analysis can provide a means to identify clay minerals, and help for the resolution of radioactive anomalies in clean formations that may be misinterpreted as shale zones using only a total gamma ray log.

In operations in which the tool string further includes a neutron source, such as a pulsed neutron generator, as found in common nuclear logging tools, drilling fluids (mud) in the borehole may be activated by the generated neutrons. Such activated mud is known to emit gamma rays that may be detected by a natural gamma ray sensor and thereby bias the natural gamma ray logging measurements. While methods are known for correcting natural gamma ray measurements for activated mud effects (e.g., activated oxygen gamma rays), there remains a need in the art for improved methods, for example, for reducing or minimizing error.

SUMMARY

A method for making a natural gamma ray measurement is disclosed. The method includes circulating drilling fluid in a logging while drilling tool deployed in a subterranean wellbore. The LWD tool (or tool string) includes an electrical neutron source and a natural gamma ray sensor. The neutron output of the electrical neutron source is modulated and the natural gamma ray sensor is used to make a corresponding gamma ray measurement during at least a portion of the modulation. The gamma ray measurement is processed to obtain a corrected total natural gamma ray measurement of the subterranean formation.

The disclosed embodiments may provide various technical advantages. For example, the disclosed methods may advantageously reduce or substantially eliminate the influence of drilling fluid activation induced by fast neutrons. The disclosed embodiments may therefore provide corrected total natural gamma ray measurements that account for drilling fluid activation (e.g., oxygen activation) during a natural gamma ray logging operation and may therefore provide for an accurate determination of the total natural radioactivity in the subterranean formation. The correction methodology may improve both the accuracy and precision of total natural gamma ray measurements and therefore provide for improved formation evaluation.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 3 depicts gamma ray spectra for a test granite formation with and without oxygen activation.

FIG. 4 depicts a flow chart of one disclosed method embodiment.

FIG. 5 depicts a flow chart of another disclosed method embodiment.

DETAILED DESCRIPTION

Figure 1:
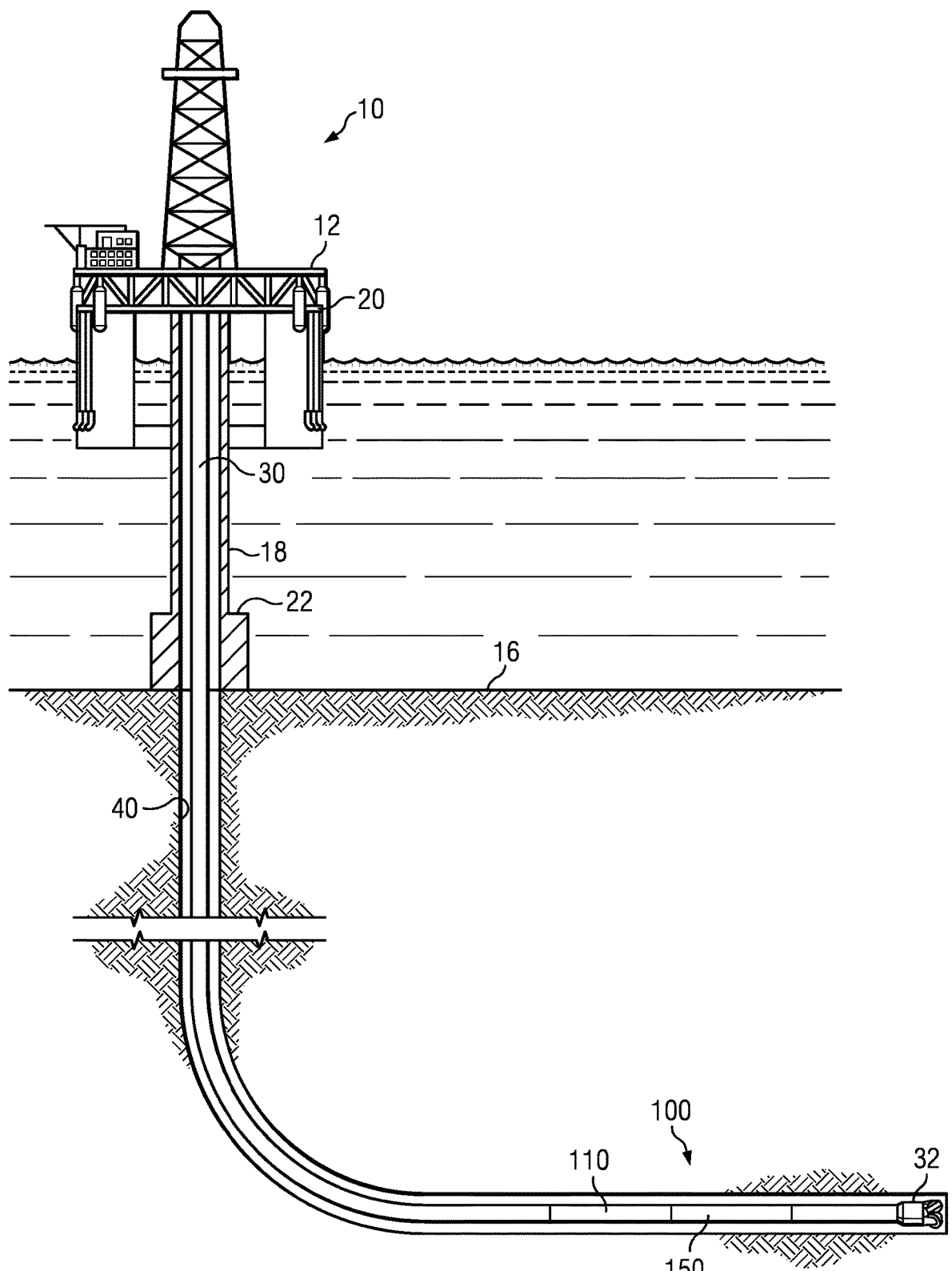
FIG. 1 depicts one example of a drilling rig on which disclosed logging string and logging method embodiments may be utilized.

FIG. 1 depicts one example embodiment of a nuclear logging string 100 in use in an offshore oil or gas drilling assembly, generally denoted 10. In FIG. 1, a semisubmersible drilling platform 12 is positioned over an oil or gas formation disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and the nuclear logging string 100. Embodiments of the nuclear logging string 100 include at least one neutron source and at least one gamma ray sensor. For example, in the depicted embodiment, logging string 100 includes a neutron logging tool 110 including a neutron source and a gamma ray logging tool 150 including a gamma ray sensor (of course the neutron source and gamma ray sensor may also be deployed in the same tool). Drill string 30 may further include, for example, a downhole drilling motor, a mud pulse telemetry system, a steering tool, and/or one or more of numerous other measurement while drilling (MWD) and logging while drilling (LWD) sensors for sensing downhole characteristics of the borehole and the surrounding formation. The disclosed embodiments are not limited in these regards.

It will be understood that the deployment depicted on FIG. 1 is merely an example for the purposes of describing the disclosed embodiments. It will be further understood that methods in accordance with the disclosed embodiments are not limited to use in offshore drilling operations, but are equally well suited for use with any kind of subterranean drilling operation, either offshore or onshore.

Figure 2A:
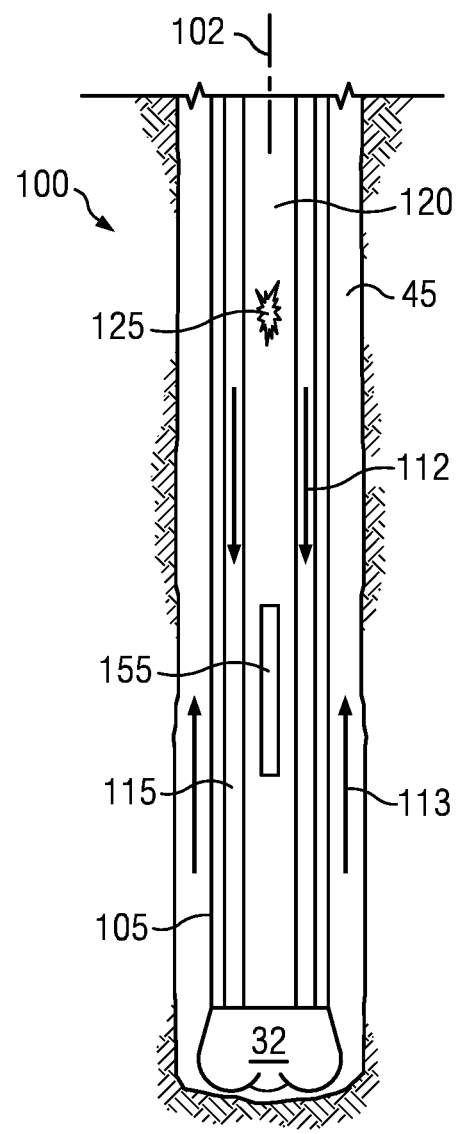
FIGS. 2A and 2B depict mandrel (2A) and chassis (2B) based embodiments of the nuclear logging string shown on FIG. 1.
Figure 2B:
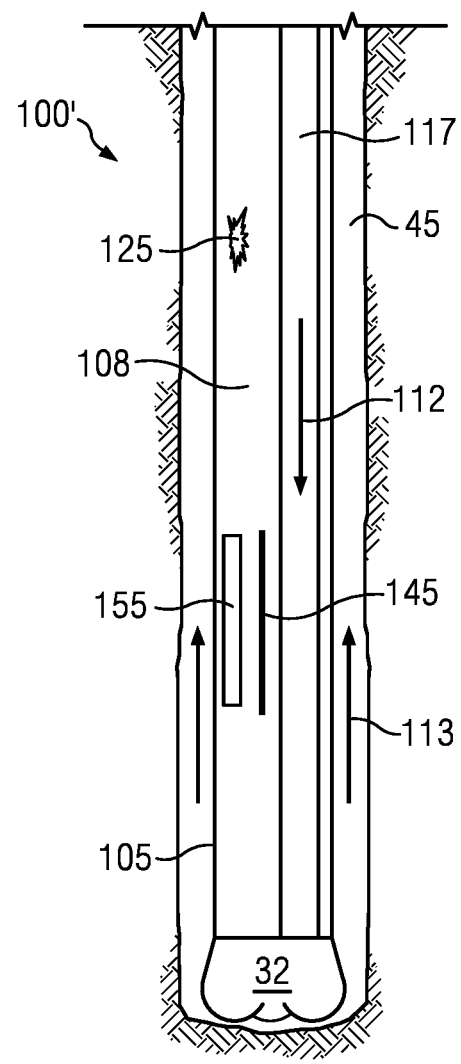

FIGS. 2A and 2B depict mandrel (2A) and chassis (2B) based embodiments of nuclear logging string 100. In FIG. 2A logging string 100 includes a central mandrel 120 on which the neutron source 125 and the gamma ray detector 155 are deployed. In the depicted embodiment, the mandrel 120 and the gamma ray detector 155 are substantially coaxial with a longitudinal axis 102 of the string 100. Drilling fluid is pumped downhole 112 through an annular flow channel 115 (radially between mandrel 120 and drill collar 105) to the bit 32 and flows upwards 113 through wellbore annulus 45.

In FIG. 2B logging string 100' includes a neutron source 125 and a gamma ray detector 155 deployed off axis in a drill collar 105 or tool chassis 108. Drilling fluid is pumped downhole 112 through an off axis channel 117 and flows upwards 113 through wellbore annulus 45. Optional shielding 145 may be provided between the gamma ray detector 155 and the channel 117. As is known by those of ordinary skill, the gamma ray detector 155 may include substantially any suitable gamma ray detector, for example, including a sodium iodide (NaI) scintillator crystal and a photomultiplier.

With continued reference to FIGS. 2A and 2B, neutron source 125 may include substantially any suitable electrical neutron source. The electrical source may be substantially continuous or pulsed and may make use of the deuterium-tritium (d-T) nuclear reaction, the deuterium-deuterium (d-D) nuclear reaction, and/or the tritium-tritium (t-T) nuclear reaction for example. Pulsed neutron generators (PNG) that make use of the d-T nuclear reaction are well known and are commonly used to irradiate the subterranean formation with high energy neutrons (e.g., 14 MeV neutrons), for example, to provide a formation porosity map. During a nuclear logging operation this high energy neutron flux may activate elements in the drilling fluid (mud) as it passes by the neutron generator on the way to the bit. For example, the $^{16}O$ oxygen isotope may be activated to produce the $^{16}N$ nitrogen isotope, which decays back to $^{16}O$ with a half-life of about 7 seconds thereby resulting in the emission of a 6.13 MeV gamma ray.

The gamma-ray detector 155, while intended to measure the natural gamma-ray activity of the formation, may also detect the above-described gamma-rays that originate in the mud. For example, oxygen activation induced gamma rays may be detected when downwardly flowing mud 112 in the tool string and/or upwardly flowing mud 113 in the annulus emits gamma rays in the vicinity of the detector 155. The resulting natural gamma ray measurements are thereby corrupted and commonly require correction to accurately reflect the properties of the formation.

FIG. 3 depicts gamma ray spectra for a granite test formation with 180 and without 190 oxygen activation that illustrates the problem. The spectra are depicted as plots of gamma ray counts (or count rates) on the vertical axis versus energy on the horizontal axis (in units of MeV as indicated). It will be appreciated that the terms count and count rate in reference to gamma ray measurements are used interchangeably herein. Note that oxygen activation increases the received gamma ray counts, particularly at energies greater than about 1.5 MeV and most particularly at energies greater than about 3 MeV. In the depicted example, oxygen activation results in about a two-fold increase in the number of gamma rays having energies between about 1.5 and about 3 MeV and about a 100 times increase in the number of gamma rays having energies greater than about 3 MeV. It will thus be understood that oxygen activation can, in certain operational circumstances, have a significant impact on natural gamma ray logging measurements.

One approach for correcting natural gamma ray measurements includes determining one or more standard spectra for gamma rays emitted by activated mud (e.g., by oxygen activation). The measured gamma-ray spectrum may then be analyzed as a combination of the standard spectra of the elements of the formation generating natural gamma-ray as well as the one or more standard spectra of the mud activation. From this analysis, it is possible to derive the part of the spectrum due to the mud activation and to correct the total count rate measured by the gamma ray detector by subtracting the count rate due to the detection of gamma rays from activated mud.

Commonly assigned U.S. Pat. No. 7,081,616, which is incorporated by reference in its entirety herein, discloses another approach in which the measured gamma ray spectrum is evaluated to determine a count rate corresponding to gamma rays having an energy in a correction interval above a predetermined threshold (the threshold corresponding generally to an energy threshold that natural gamma rays do not reach, for example, above about 3 MeV). A correction count rate, corresponding to the gamma rays derived from mud activation, is determined from the count rate above the threshold and is subtracted from the total count rate. Assuming that the spectral shape of gamma rays induced by activated drilling fluid remains unchanged during the measurement, the number of counts above the threshold (referred to in the art as T4) is directly proportional to the total number of gamma rays induced by the activated drilling fluid (referred to in the art as T1). A ratio R=T1/T4 may be computed based on laboratory measurements of oxygen activation spectra (e.g., based on gamma ray spectra measured from activated mud circulating inside a logging tool and/or outside a logging tool). During a logging operation, the count rate above the threshold (e.g., above about 3 MeV) may be multiplied by R to determine the correction count rate which may then be subtracted from the total count rate. This correction methodology is commonly referred to in the art as a T1/T4 correction.

While the above described correction methods are serviceable, they can be prone to error. For example, the relative contribution of mud based gamma rays and the shape of the mud activation gamma ray spectra can vary during a logging operation.

FIG. 4 depicts a flow chart of one disclosed method embodiment 200. An LWD tool string including a neutron source and a gamma ray sensor is deployed in a subterranean wellbore at 202 (e.g., as depicted in FIG. 1). Drilling fluid is circulated through the LWD string (e.g., during a drilling operation). The neutron source provides a modulated output of neutrons at 204 thereby activating the circulating drilling fluid (i.e., inducing the drilling fluid to emit gamma rays as described above). As described in more detail below, neutron source modulation is intended to modulate the count rate of the gamma rays induced by the activated drilling fluid such that these "activation gamma rays" may be identified and removed from the measurement or not detected/measured at all.

Gamma rays are detected at 206 using a natural gamma ray detector. In certain embodiments, the detected gamma rays are substantially free of activation gamma rays (i.e., are essentially entirely natural gamma rays emitted by the formation). In certain other embodiments, the detected gamma rays may include both natural gamma rays emitted by the formation and the activation gamma rays emitted by the activated drilling fluid (e.g., activated oxygen in the drilling fluid). In embodiments in which the detected gamma rays include activation gamma rays, the detected gamma rays may be processed at 208 to obtain a corrected natural gamma ray measurement (to thereby remove the activation gamma rays counts from the measurement). The corrected natural gamma ray measurement provides an indication of the total natural radioactivity of the subterranean formation. The corrected total natural gamma ray log may be evaluated, for example, to provide well to well correlation of formation layers within a field, to distinguish between shale and radioactively clean layers, to identify formation lithology, and/or to estimate a volume of shale present in the formation.

It will be understood that the neutron modulation in 204 may be applied to substantially any type of electrical neutron generator. For example, the neutron generator may be a pulsed neutron generator in which neutrons are emitted in high frequency bursts such as described in U.S. Pat. Nos. 4,926,044; 6,703,606 and 7,365,307. The neutron generator may also run in a "DC" mode without any high frequency pulses or bursts.

It will be further understood that the neutron modulation in 204 is a low frequency modulation in comparison to the high frequency bursts or pulses commonly utilized in pulsed neutron generators. The neutron modulation frequency in 204 may be one or more orders of magnitude (e.g., two or three orders of magnitude) less than the high frequency bursts or pulses. For example, the neutron modulation in 204 is generally less than 10 Hertz (e.g., in a range from about 0.01 to about 10 Hz, in a range from about 0.02 to about 5 Hz, or in a range from about 0.05 to about 2 Hz) while the high frequency bursts or pulses utilized in pulsed neutron generators are generally on the order of 10 kHz (10,000 Hz) to 100 kHz (100,000 Hz). In embodiments that employ pulsed (or burst) neutron generation, the modulation applied in 204 may be thought of as providing a low frequency modulation of (or envelope about) the high frequency pulse amplitude.

FIG. 5 depicts a flow chart of another disclosed method embodiment 220. An LWD tool string including a neutron source and a gamma ray sensor is deployed in a subterranean wellbore at 222 (e.g., as depicted in FIG. 1). The neutron source is turned off on occasion while drilling at 224. In this modulation scheme, the neutron source is turned off long enough for the activated drilling mud to travel downhole to the drill bit (e.g., through flow channel 115 or flow channel 117) and then uphole through the annulus past the natural gamma ray detector (e.g., on the order of a few seconds or longer depending on the geometry of the BHA and the drilling fluid flow rate).

Gamma rays are detected at 226 using a natural gamma ray detector. A start time for the natural gamma ray measurement interval may be determined based on the count rate of high energy gamma rays (e.g., above 3 MeV). For example, the natural gamma ray measurement acquisition may be triggered when the count rate of high energy gamma rays falls below a predetermined threshold sufficient to ensure acceptable accuracy and precision of the natural gamma ray measurement. For example, high energy count rate may be essentially zero to ensure optimum precision and accuracy. In another embodiment, the initiation time of the natural gamma ray measurement interval may be computed based upon the drilling fluid flow rate and the bottom hole assembly configuration. For example, the natural gamma ray measurement acquisition may be initiated at some time interval after the neutron source is turned off. The time interval may be intended to provide sufficient time for the activated drilling mud to travel from the neutron source downhole to the drill bit and then uphole past the natural gamma ray sensor. The natural gamma ray measurement may be evaluated, for example, to provide well to well correlation of formation layers within a field, to distinguish between shale and radioactively clean layers, to identify formation lithology, and/or to estimate a volume of shale present in the formation.

Figure 6A:
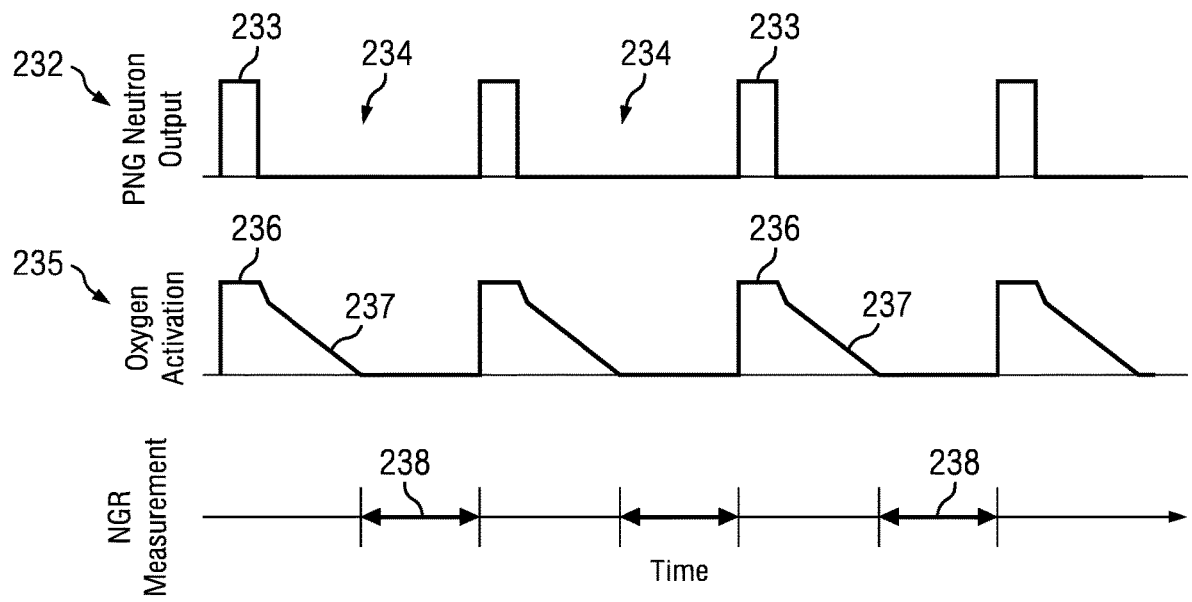
FIGS. 6A and 6B depict example timing schemes for the method embodiment show on FIG. 5.

FIG. 6A depicts one example timing scheme for method 220. Modulation of the neutron source at 224 is depicted at 232 where the neutron source is shown to be on at 233 and off at 234. Corresponding oxygen activation at the natural gamma ray detector is depicted at 235 and is a maximum at 236 when the neutron source is on and decreases 237 to essentially zero after the neutron source is turned off and the activated drill mud flows through the tool string and past the natural gamma ray detector in the annulus. The natural gamma ray measurement interval is depicted at 238 and corresponds to the time interval when the oxygen activation counts are below a threshold (e.g., between the time at which the oxygen activation counts decrease to near zero and turning on the neutron source).

It will be understood that method 220 may advantageously provide a highly accurate natural gamma ray measurement having minimal (essentially zero) activated drilling fluid gamma ray counts. One drawback of method 220 is that it requires the neutron source to be turned off for relatively long intervals so that the activated drilling fluid can flow through the tool string and then uphole through the annulus past the natural gamma ray sensor. These "off" intervals may reduce the statistical precision of other measurements that use the neutron source as a primary source of radiation (e.g., neutron logging measurements). The natural gamma ray measurements may also have reduced statistical precision since the gamma ray detector is active for only a portion of the drilling time as depicted on FIG. 6A (e.g., the duty cycle may be less than 0.5).

Figure 6B:
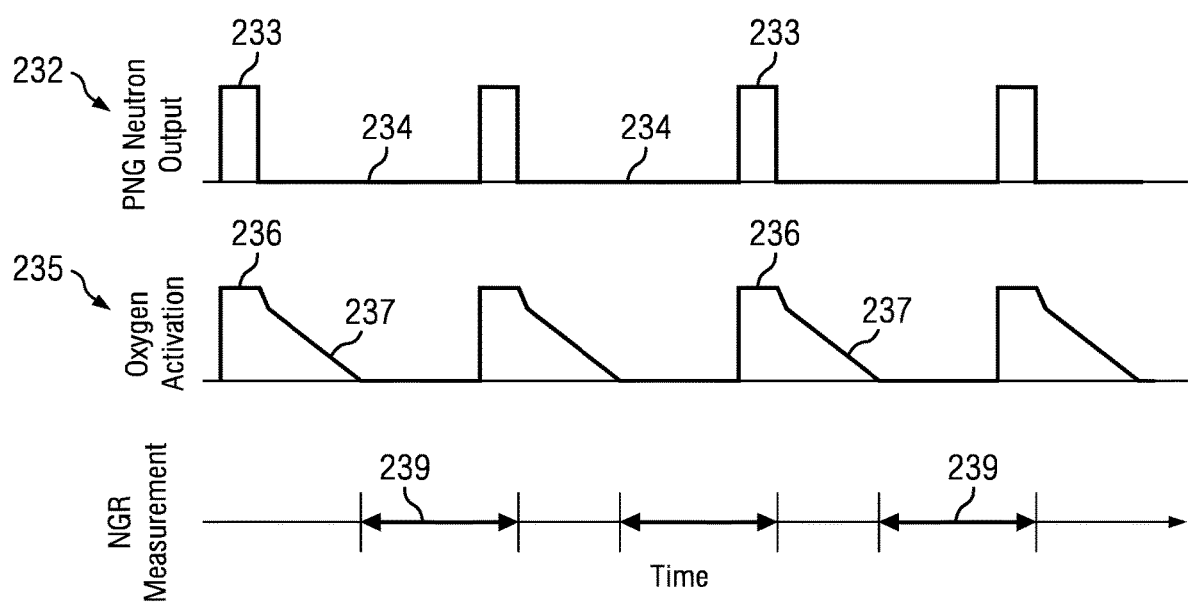

In a related embodiment, the natural gamma ray measurements made while the neutron source is off may be used to correct natural gamma ray measurements made when the neutron source is active. FIG. 6B depicts an alternative timing scheme for method 220 in which natural gamma ray measurements are also made while the neutron source is on at 239. Natural gamma ray measurements made while the neutron source is off may be subtracted from the measurements made while the neutron source is on to compute the gamma ray count corresponding to the activated drilling fluid, which may in turn be subtracted from the subsequent measurements made while the neutron source is on.

Figure 7:
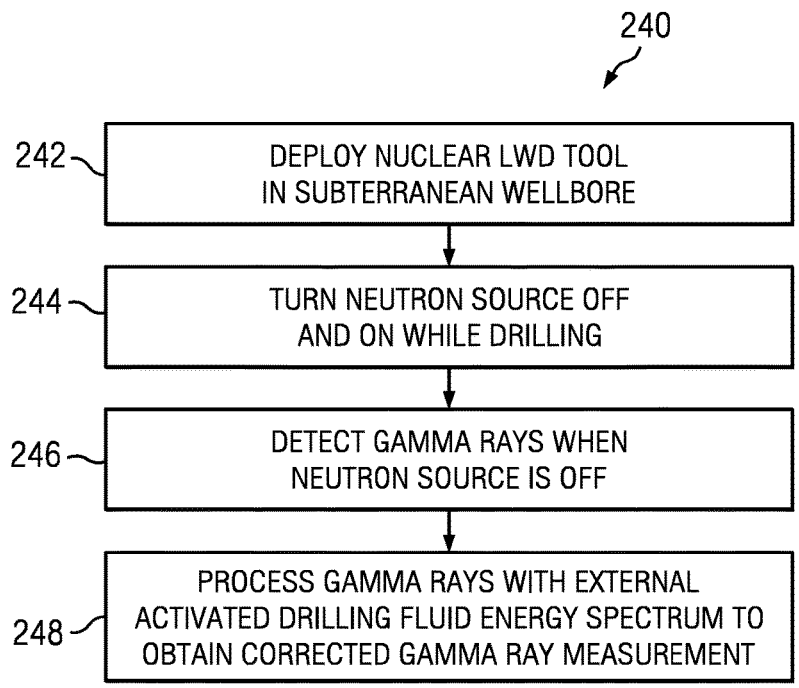
FIG. 7 depicts a flow chart of still another disclosed method embodiment.

FIG. 7 depicts a flow chart of still another disclosed method embodiment 240. An LWD tool string including a neutron source and a gamma ray sensor is deployed in a subterranean wellbore at 242 (e.g., as depicted in FIG. 1). Method 240 is similar to method 220 in that the neutron source is turned on and off at 244. In this modulation scheme, the neutron source is turned off long enough for the activated drilling mud to travel downhole past the natural gamma ray sensor (e.g., through flow channel 115 or flow channel 117). Method 240 differs from method 220 in that the neutron source "off" cycle may be significantly shorter and is intended to eliminate drilling fluid activation gamma ray counts only from drilling fluid in the interior of the LWD tool.

Gamma rays are detected at 246 using a natural gamma ray detector. A start time for the natural gamma ray measurement interval may be determined based upon the drilling fluid flow rate and the distance between the neutron source and the natural gamma ray detector with the time interval being computed to provide sufficient time for the activated drilling mud to travel from the neutron source past the gamma ray sensor. The gamma rays detected at 246 may include natural gamma emitted by the formation and activation gamma rays emitted by the activated drilling fluid flowing uphole through the annulus. The acquired gamma ray counts may be processed at 248, for example, using a conventional T4/T1 correction in combination with a standard spectrum for activated drilling fluid flowing outside the logging tool to remove the activation gamma ray counts and obtain a corrected gamma ray measurement. The standard spectra may be obtained, for example, via laboratory measurements and/or modeling. As noted above, the corrected measurement may be evaluated, for example, to provide well to well correlation of formation layers within a field, to distinguish between shale and radioactively clean layers, to identify formation lithology, and/or to estimate a volume of shale present in the formation.

Figure 8:
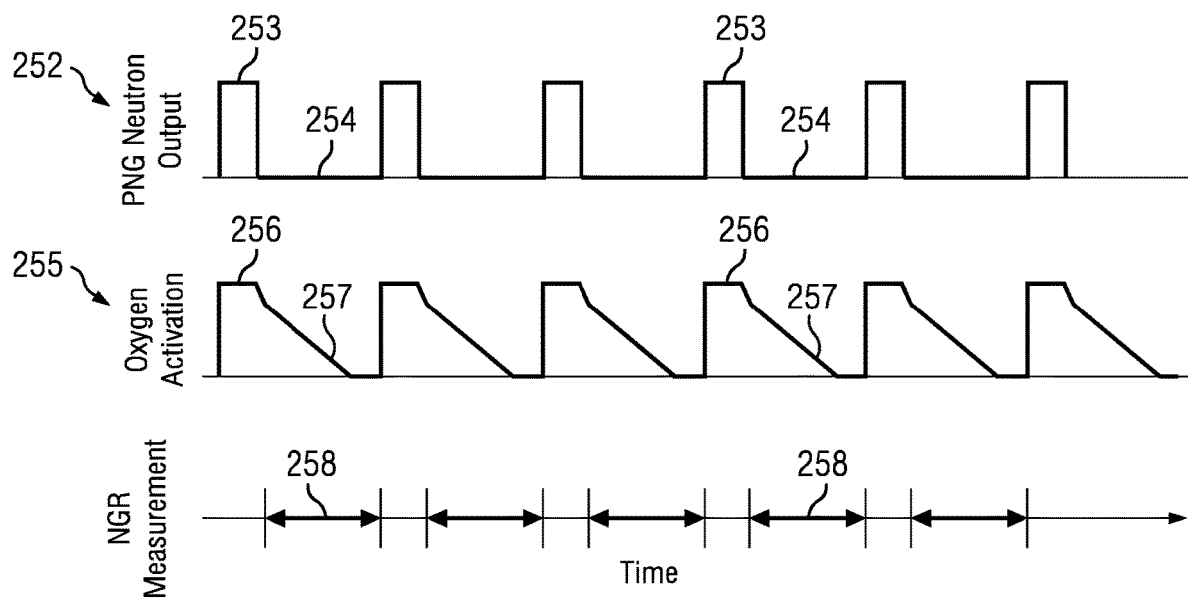
FIG. 8 depicts one example timing scheme for the method embodiment show on FIG. 7.

FIG. 8 depicts one example timing scheme for method 240. Modulation of the neutron source at 244 is depicted at 252 where the neutron source is shown to be on at 253 and off at 254. Corresponding oxygen activation at the natural gamma ray detector is depicted at 255 and is a maximum at 256 when the neutron source is on and decreases at 257 to essentially zero. The natural gamma ray measurement interval is depicted at 258 and corresponds to the time interval in which the activated drilling fluid has flowed past the natural gamma ray sensor (in the interior of the tool). Note that the natural gamma ray measurement interval overlaps with the detection of gamma rays emitted by the activated drilling fluid flowing uphole through the annulus.

Method 240 may advantageously provide a highly accurate natural gamma ray measurement having significantly lower oxygen activation gamma ray counts than a conventional measurement. These measurements may therefore further have improved accuracy after an activation correction is applied (e.g., a T4/T1 correction). Moreover, the neutron source "off" intervals are relatively short thereby enabling neutron logging measurements to be made with good statistical precision.

Figure 9:
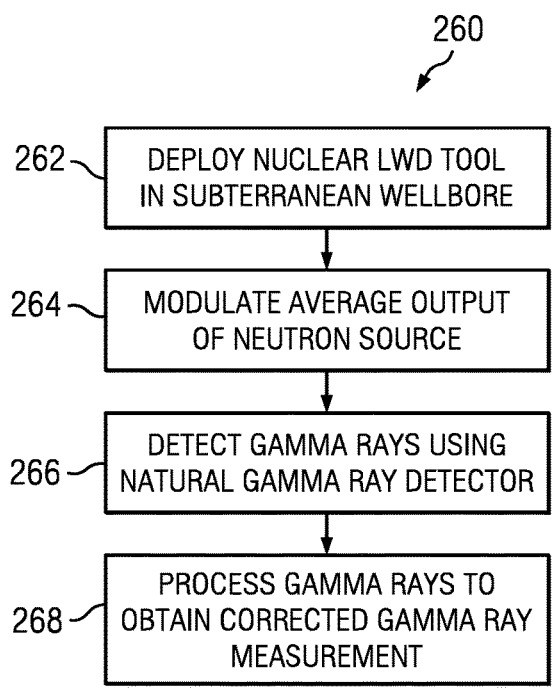
FIG. 9 depicts a flow chart of yet another disclosed method embodiment.

FIG. 9 depicts a flow chart of yet another disclosed method embodiment 260. An LWD tool string including a neutron source and a gamma ray sensor is deployed in a subterranean wellbore at 262 (e.g., as depicted in FIG. 1). The average output of the neutron source is modulated in time at 264. In this modulation scheme, the average output of the neutron source is modulated (e.g., periodically) to relatively high and relatively low outputs such that the drilling fluid activation is also modulated. The modulation may include substantially any waveform, for example, including sinusoidal, triangular, and square wave modulation. As described above, the modulation frequency is low relative to the high frequency bursts or pulses commonly utilized in pulsed neutron generators and high relative to the rate at which the natural gamma ray signal changes with time (e.g., as function of the rate of penetration of drilling). For example, the modulation frequency may be in a range from about 0.01 to about 10 Hz (e.g., from about 0.02 to about 5 Hz or from about 0.05 to about 2 Hz).

Gamma rays are detected at 266 using a natural gamma ray detector. The detected gamma rays may be evaluated, for example, using frequency spectrum analysis techniques and/or filtering techniques at 268 to remove at least a portion of the gamma rays resulting from drilling fluid activation and to obtain a corrected gamma ray measurement. The corrected measurement may then be evaluated, for example, as described above to provide well to well correlation of formation layers within a field, to distinguish between shale and radioactively clean layers, to identify formation lithology, and/or to estimate a volume of shale present in the formation.

Figure 10:
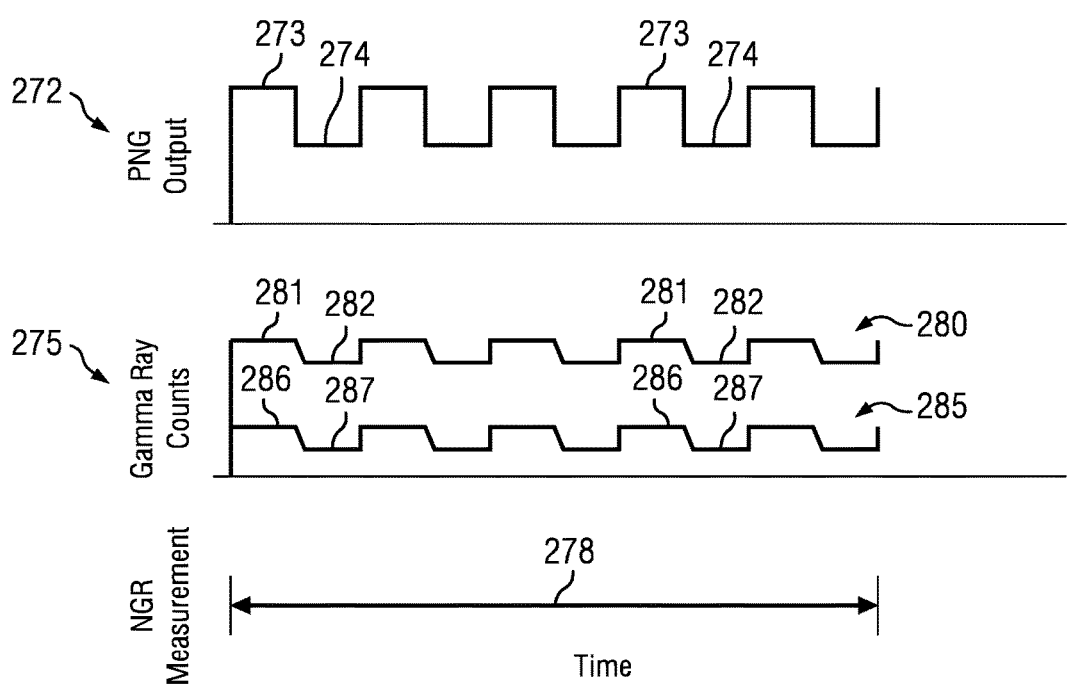
FIG. 10 depicts one example timing scheme for the method embodiment show on FIG. 9.

FIG. 10 depicts one example timing scheme for method 260. Modulation of the neutron source at 264 is depicted at 272. In this particular embodiment, a square wave modulation is employed such that the emitted neutrons are modulated between maximum 273 and minimum 274 values (it will be understood that the disclosed embodiments are not limited to square wave modulation). A plot of gamma ray counts versus time is depicted at 275 with an example gamma ray measurement (including both natural and activation gamma rays) being depicted at 280 and corresponding activation gamma rays being depicted at 285. Both the gamma ray measurement and the activation gamma rays undergo modulation between maximum 281 and 286 and minimum 282 and 287 values (as depicted). The natural gamma ray measurement is depicted at 278 and as depicted may be thought of as being always on (i.e., is not turned on and off with the neutron source modulation).

A true (corrected) total natural gamma ray measurement may be computed, for example, from first and second natural gamma ray measurements corresponding to the maximum 273 and minimum 274 values of neutron emission in the neutron modulation scheme. It will be understood that neutron source modulation only modulates the drilling fluid (e.g., oxygen) activation gamma rays (e.g., as depicted at 275) but does not modulate (or in any way influence) the true (real) total natural gamma ray emission of the formation. The first and second natural gamma ray measurements may expressed mathematically, for example, as follows:

$$GRM1 = NGR + AGR$$

$$GRM2 = NGR + X \cdot AGR$$

where GRM1 and GRM2 represent the first and second gamma ray measurements corresponding to the maximum and minimum neutron outputs in the modulation scheme (GRM1 and GRM2 are depicted, for example, at 281 and 282), NGR represents the true natural gamma ray count rate, AGR represents the activation gamma ray count rate at the maximum neutron output, and X represents a ratio of the minimum to maximum neutron output in the modulation scheme such that 0≤X<1. These equations may be solved simultaneously to obtain a mathematical expression for the true natural gamma ray count rate, for example, as follows:

$$NGR = \frac{GRM2 - X \cdot GRM1}{1 - X}$$

It will be understood that the above equation assumes that the activation gamma ray count is substantially proportional to the neutron source output. The disclosed embodiments are of course not limited in this regard. In the above equation X may be substituted with X' indicating that the activation gamma ray count is a non-proportional (or non-linear) function of the neutron output.

Method 260 may advantageously provide a highly accurate corrected natural gamma ray measurement in which gamma rays emitted by activated drilling fluid are removed based on a characteristic frequency rather than other assumptions such as the spectral shape of the activation gamma rays. Method 260 further provides for accurate neutron logging measurements having good statistical precision since the neutron source remains on (modulating between relatively high and low values).

Figure 11:
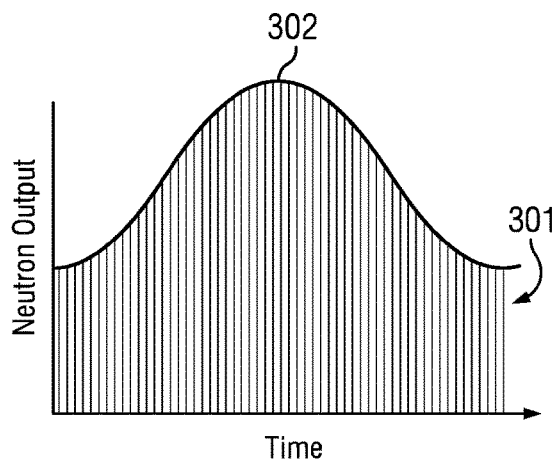
FIG. 11 depicts a schematic plot of neutron output versus time for one example embodiment.

As noted above, the neutron modulation in the disclosed embodiments is a very low frequency modulation (e.g., in a range from about 0.01 to about 10 Hz) in comparison to the high frequency bursts or pulses commonly utilized in pulsed neutron generators (which is on the order of 10 kHz to 100 kHz). For example, the neutron modulation frequency may be on the order of two, three, or more orders of magnitude less than the high frequency bursts or pulses. As further noted above, in embodiments employing pulsed (or burst) neutron generation, the disclosed modulation may be thought of as providing a low frequency modulation of (or envelope about) the high frequency pulse amplitude such that the amplitude of (or number of neutrons generated in) the high frequency pulses is modulated. This is depicted schematically in FIG. 11 which plots neutron output versus time. Note that the neutron output of a series of high frequency pulses 301 (or bursts) is modulated by the low frequency envelope 302.

With continued reference to FIGS. 4-11, it will be appreciated that the gamma ray measurements may be total gamma ray measurements (non-spectral) or spectral gamma ray measurements may be made over substantially any suitable number of energy windows. In certain embodiments a measured gamma ray spectrum may include a small number of broad energy windows, for example from about three to about five windows. In other embodiments the measured gamma ray spectrum may include a larger number of fine energy channels, for example including 128 or more channels. The disclosed embodiments are not limited in this regard.

With reference again to FIGS. 2A and 2B, it will be appreciated that a mandrel based gamma ray detector (as depicted on FIG. 2A) is generally more sensitive to down flow activation and less sensitive to up flow activation (as the gamma ray sensor is in closer proximity to the downwardly flowing drilling fluid). A chassis based gamma ray sensor (as depicted on FIG. 2B) is generally more sensitive to up flow activation and less sensitive to down flow activation (as the gamma ray sensor is in closer proximity to the upwardly flowing drilling fluid and may optionally be shielded from the downwardly flowing fluid). Notwithstanding the above, the disclosed embodiments are intended to be suitable for use with substantially any logging string and gamma ray detector configuration.

While not depicted in the FIGS., it will be understood that a portion of the disclosed method embodiments may be implemented downhole (e.g., by a downhole controller deployed in the logging string). Moreover, it will be further understood that the aspects and features of the disclosed embodiments may be embodied as logic that may be processed by, for example, a computer, a microprocessor, hardware, firmware, programmable circuitry, or any other processing device known in the art. Similarly the logic may be embodied on software suitable to be executed by a processor, as is also well known in the art. The disclosed embodiments are not limited in any of these regards.

A suitable downhole controller may include, for example, a programmable processor, such as a microprocessor or a microcontroller and processor-readable or computer-readable program code embodying logic. A suitable processor may be utilized, for example, to execute a portion of the method embodiments described above with respect to FIGS. 4-11. For example, a downhole controller may be configured to process measured gamma ray spectra to compute potassium, uranium, and thorium yields (counts) which may be further processed to compute concentrations of potassium, uranium, and thorium in the subterranean formation. The yields and/or concentrations may be optionally transmitted to the surface while drilling (e.g., via known telemetry techniques).

A suitable controller may be further configured to control operation of the natural gamma ray detector(s) and the neutron generator(s) (e.g., to modulate the neutron source and/or to initiate a natural gamma ray measurement cycle). A suitable controller may also optionally include other controllable components, such as data storage devices, power supplies, timers, and the like and may optionally communicate with other instruments in the drill string, for example, including telemetry systems that communicate with the surface. A suitable controller may further optionally include volatile or non-volatile memory or a data storage device for storing measured gamma ray spectra for further post-processing.

Although a method for making natural gamma ray logging measurements and certain advantages thereof have been described in detail, it should be understood that various changes, substitutions and alternations can be made herein without departing from the spirit and scope of the disclosure as defined by the appended claims.

What is claimed is:

1. A method for making natural gamma ray measurements of a subterranean formation, the method comprising:
   (a) circulating drilling fluid through a logging while drilling string deployed in a subterranean wellbore, the logging while drilling string including an electrical neutron source and a natural gamma ray sensor;
   (b) modulating a neutron output of the electrical neutron source between a maximum neutron output and a minimum neutron output while circulating in (a);
   (c) causing the natural gamma ray sensor to make a gamma ray measurement while modulating in (b), wherein the gamma ray measurement undergoes a modulation between a first gamma ray count corresponding to the maximum neutron output and a second gamma ray count corresponding to the minimum neutron output; and
   (d) processing the gamma ray measurement made in (c) by computing a difference between the first gamma ray count and the second gamma ray count to compute an activation gamma ray count and subtracting the activation gamma ray count from the gamma ray measurements made when the electrical neutron source is on to obtain a corrected total natural gamma ray measurement of the subterranean formation.

2. The method of claim 1, wherein the neutron output is modulated at a frequency in a range from about 0.01 to about 10 Hz.

3. The method of claim 1, wherein the electrical neutron source is a pulsed neutron generator and said modulation modulates an amplitude of emitted neutron pulses.

4. The method of claim 1, further comprising:
(e) evaluating the corrected total natural gamma ray measurement to provide well to well correlation of formation layers within a field, to distinguish between shale and radioactively clean layers, identify formation lithology, and/or estimate a volume of shale present in the formation.

5. A method for making natural gamma ray measurements of a subterranean formation, the method comprising:
(a) circulating drilling fluid through a logging while drilling string deployed in a subterranean wellbore, the logging while drilling string including an electrical neutron source and a natural gamma ray sensor;
(b) turning the electrical neutron source on and off while circulating in (a);
(c) causing the natural gamma ray sensor to make a-gamma ray measurements when the electrical neutron source is turned on and off in (b); and
(d) processing the gamma ray measurements made in (c) by subtracting the gamma ray measurements made while the electrical neutron source is off from the gamma ray measurements made when the electrical neutron source is on to compute an activation gamma ray count and subtracting the activation gamma ray count from the gamma ray measurements made when the electrical neutron source is on to obtain a corrected total natural gamma ray measurement of the subterranean formation.

6. The method of claim 5, wherein an initiation time for the gamma ray measurement in (c) is computed from a drilling fluid flow rate in the logging while drilling string and a distance between the electrical neutron source and the drill bit.

7. The method of claim 5, wherein the electrical neutron source is turned off for a sufficiently long time for the circulating drilling fluid to flow from the electrical neutron source downhole to a drill bit and then uphole past the natural gamma ray sensor prior to initiation of the gamma ray measurement in (c).

8. The method of claim 5, wherein the electrical neutron source is turned off for a sufficiently long time after the electrical neutron source has been turned off for the circulating drilling fluid to flow from the electrical neutron source downhole past the natural gamma ray sensor prior to initiation of the gamma ray measurement in (c).

9. The method of claim 5, further comprising:
(e) evaluating the corrected total natural gamma ray to provide well to well correlation of formation layers within a field, to distinguish between shale and radioactively clean layers, identify formation lithology, and/or estimate a volume of shale present in the formation.

10. A method for making natural gamma ray measurements of a subterranean formation, the method comprising:
(a) circulating drilling fluid through a logging while drilling string deployed in a subterranean wellbore, the logging while drilling string including an electrical pulsed neutron source and a natural gamma ray sensor;
(b) modulating a neutron output of the electrical pulsed neutron source while circulating in (a), wherein said modulation modulates an amplitude of emitted neutron pulses between a maximum neutron output and a non-zero minimum neutron output and said modulation has a frequency less than a frequency of the emitted neutron pulses;
(c) causing the natural gamma ray sensor to acquire a gamma ray measurement during said modulation in (b), wherein the gamma ray measurement undergoes a modulation between a first gamma ray count corresponding to the maximum neutron output and a second gamma ray count corresponding to the minimum neutron output; and
(d) processing the gamma ray measurement made in (c) by computing a difference between the first gamma ray count and the second gamma ray count to compute an activation gamma ray count and subtracting the activation gamma ray count from the gamma ray measurements made when the electrical neutron source is on to obtain a corrected total natural gamma ray measurement of the subterranean formation.

11. The method of claim 10, wherein the neutron output is modulated at a frequency in a range from about 0.01 to about 10 Hz.

12. The method of claim 10, wherein said modulation has a frequency at least one order of magnitude less than the frequency of the emitted neutron pulses.

13. The method of claim 10, wherein said modulation in (b) is selected from the group consisting of a square wave modulation, a sine wave modulation, and a triangular wave modulation.

14. The method of claim 10, wherein the corrected total natural gamma ray measurement is computed in (d) using the following equation:

$$NGR = \frac{GRM2 - X \cdot GRM1}{1 - X}$$

wherein NGR represents the corrected total natural gamma ray measurement, GRM1 and GRM2 represent the first and second gamma ray count corresponding to the maximum and minimum neutron outputs, and X represents a ratio of the minimum to maximum neutron outputs such that $0 \leq X < 1$.

15. The method of claim 10, further comprising:
(e) evaluating the corrected total natural gamma ray measurement to provide well to well correlation of formation layers within a field, to distinguish between shale and radioactively clean layers, identify formation lithology, and/or estimate a volume of shale present in the formation.

* * * * *